United States Patent [19]

Shikinami et al.

[11] 4,144,153

[45] Mar. 13, 1979

[54] RADIATION PROCESS FOR PRODUCING 1,2-POLYBUTADIENE FOAMED PRODUCTS

[75] Inventors: Yasuo Shikinami, Kusatsu; Ryuichi Kimura, Kyoto; Yoshinobu Yoshikawa, Azuchi; Kosuke Iida, Azuchi; Kunihiro Hata, Azuchi, all of Japan

[73] Assignee: Takiron Co., Ltd., Azuchi, Japan

[21] Appl. No.: 728,653

[22] Filed: Oct. 1, 1976

[30] Foreign Application Priority Data

Oct. 3, 1975 [JP] Japan .................................. 50-120062
Mar. 8, 1976 [JP] Japan .................................. 51-25250

[51] Int. Cl.² .............................................. C08F 2/46
[52] U.S. Cl. .............................. 204/159.2; 204/159.18; 260/DIG. 43; 521/150; 521/915; 521/916
[58] Field of Search ........................ 204/159.2, 159.17; 260/DIG. 43, 2.5 HA, 2.5 HB

[56] References Cited

U.S. PATENT DOCUMENTS

| | | | |
|---|---|---|---|
| 3,098,831 | 7/1963 | Carr .................. | 260/2.5 HA |
| 3,240,727 | 3/1966 | Scalani ............... | 260/2.5 HA |
| 3,542,702 | 11/1970 | Okada et al. ......... | 260/2.5 HA |
| 3,562,367 | 2/1971 | Shinohara et al. ...... | 204/159.2 |
| 3,709,806 | 1/1973 | Minami et al. ........ | 260/2.5 HA |
| 3,717,559 | 2/1973 | Oyama et al. ......... | 260/2.5 HA |
| 3,798,187 | 3/1974 | Miyoshi et al. ........ | 260/2.5 HB |
| 3,816,284 | 6/1974 | Kagiya et al. ........ | 260/2.5 HA |
| 3,832,312 | 8/1974 | Wright ............... | 260/2.5 HB |
| 3,852,227 | 12/1974 | Matsuda et al. ....... | 260/DIG. 43 X |
| 3,888,804 | 6/1975 | Swanholm et al. ...... | 260/2.5 HB |
| 3,891,724 | 6/1975 | Yaeda et al. .......... | 260/2.5 HA |
| 3,891,830 | 9/1976 | Takeuchi et al. ....... | 260/2.5 HA |
| 4,023,973 | 5/1977 | Imaizumi et al. ....... | 204/159.2 X |
| 4,024,324 | 5/1977 | Sparks ............... | 204/159.14 X |
| 4,029,840 | 6/1977 | Shikinami et al. ...... | 428/310 |

*Primary Examiner*—Richard B. Turer
*Attorney, Agent, or Firm*—Sughrue, Rothwell, Mion, Zinn and Macpeak

[57] ABSTRACT

A process for producing a photodegradable rubber foamed products of excellent softness, which comprises mixing 1,2-polybutadiene with 0.1 to 3.0% of a photosensitizer and with a thermally decomposable foaming agent, irradiating with ultraviolet ray of a wavelength of 240 to 400 mμ for 10 minutes or less to form a crosslinked material having a gel fraction of 30 to 80% (in boiling toluene; 7 hours), and heating to 150 to 230° C. to form a foamed product. In particularly preferred embodiments of this invention, the foaming agent is p,p'-oxybis (benzenesulfonylhydrazide).

9 Claims, No Drawings

RADIATION PROCESS FOR PRODUCING 1,2-POLYBUTADIENE FOAMED PRODUCTS

BACKGROUND OF THE INVENTION

1. Field of the Invention

The present invention relates to a process for producing a UV ray cross-linked 1,2-polybutadiene foamed products having a uniform structure and a comparatively high cross-linking degree.

2. Description of the Prior Art

Plastics are required to be durable when they are used as materials in industry, agriculture, engineering, construction, or the like. Therefore, intensive research has been carried out to increase the durability of plastics.

In recent years, however, there has been an increasing demand to develop materials which exhibit controlled natural degradation after use in order to prevent environmental pollution due to plastic waste. In general, high molecular weight compounds gradually degrade when exposed to sun light for several years, and, finally, they are degraded to such a degree that they no longer maintain their original form. This is attributable to the fact that sun light comprises irradiation having the necessary wavelength and intensity to split high molecular weight chains. The quantum yield of the molecular bond split is generally as low as $10^{-3}$ to $10^{-5}$. However, one year's exposure to sun light carries enough light energy to split ordinary high molecular weight chains, and hence high polymers are degraded, after accumulated degradation for several years, to such a degree that their original form is destroyed by a slight external force.

Ordinary plastics such as polyethylene, polypropylene, polystyrene, etc., are not easily degraded, when pure, by sun light having wavelength distribution of 290 to 400 m$\mu$ since they do not absorb radiation of longer than 300 m$\mu$ in wavelength. Therefore, in order to raise this quantum yield, it is necessary to add a photosensitizer absorbing radiation of longer than 300 m$\mu$ in wavelength to thereby expand the sensitization wavelength region.

Thus, research has been conducted on adjusting the degree of photodegradability using various photosensitizing agents. In the case of using such agents, it still takes several hours to several months to make the plastics brittle.

In general, absorption of light by molecules is necessary for a photochemical reaction. For the effective absorption of light by molecules of a material to be irradiated, the irradiating light must be well transmitted through the whole material, i.e., a totally uniform and sufficient degree of cross-linking can be attained unless the UV rays are transmitted through the material uniformly and sufficiently. Taking the transmitting capability of UV rays into consideration, it is unavoidable that the cross-linking degree becomes non-uniform in the depthwise direction. The upper limit of the amount of UV irradiation is that which is necessary to cause photodegradation of the material to be irradiated. The efficiencies of transmission and absorption of UV rays and of cross-linking at this irradiation level mainly decide the maximum thickness of practically producable cross-linked materials, and, therefore, foamed products. That is, when the efficiencies of transmission and absorption of UV irradiation or of cross-linking is low, the surface layer becomes over cross-linked, while the inner "core" is under cross-linked, resulting in inferior foamed products. 1,2-polybutadiene transmits UV rays of longer than 240 m$\mu$ well. The percent transmission thereof is double, or more, that of polyethylene.

In addition, since 1,2-polybutadiene is liable to be photocross-linked based on the vinyl groups in its side chains, it has the merit that comparatively thick uniform cross-linked materials can be obtained. However, in practice, various additives such as fillers, colorants, antioxidants, lubricants, foaming agents, etc., are usually compounded therewith, and these materials generally scatter, obstruct or absorb UV rays to prevent transmission to inner portions and reduce the efficiency of photosensitizers. Therefore, with opaque materials which contain various additives it is difficult to attain a uniform and sufficient cross-linking degree.

In order to obtain cross-linked foamed products of a comparatively high expansion ratio, it is necessary to compound a foaming agent therewith in a correspondingly large amount. The foaming agent generally scatters, obstructs or absorbs UV rays and greatly reduces the efficiency of the transmission or the response of the material being irradiated thereto. Therefore, it is difficult to obtain a uniform cross-linked material having a comparatively high cross-linking degree from foamable materials containing a large amount of a foaming agent so that comparatively thick, uniformly foamed products of a high expansion ratio are obtained only with difficulty. Thus, compounding ingredients which do not prevent the transmission of UV rays and a photosensitizing action, rather which accelerate these effects would be especially valuable.

Cross-linking of rubbery plastics or rubber includes chemical cross-linking using an organic peroxide or a sulfur compound and physical cross-linking using ionizing radiation; the latter conveniently being utilized for the production of cross-linked foamed products.

Physical cross-linking enables to design a process for continuously producing foamed products of good quality having uniform cells with a desired expansion ratio since it does not require heat and pressure to cause cross-linking as does chemical cross-linking.

On the other hand, chemical cross-linking attains cross-linking through the thermal decomposition of a cross-linking agent, and the process involves steps at various temperatures, i.e., softening point of the base resin $\leq$ kneading temperature $<$ temperature at which thermal decomposition of the cross-linking agent is initiated $\leq$ temperature at which the thermal decomposition of a foaming agent is initiated $\leq$ cross-linking and foaming temperature. In order to obtain foamed products having a uniform, fine cellular structure, it is generally necessary to conduct cross-linking prior to foaming, and thermal cross-linking takes a comparatively long period of time. This is the main factor which inhibits the practice of a simple, highly productive cross-linking process as with physical cross-linking.

However, cross-linking using ionizing radiation involves high equipment cost for related equipment to shield radiation harmful to humans as well as for the main equipment. In addition, such a process is not advantageous from the viewpoint of the steps involved.

Japanese Patent Publication No. 10298/71 describes a process for cross-linking and foaming by irradiating polyethylene with ultraviolet rays of low energy. However, pure polyethylene does not absorb radiation having a wavelength of 150 m$\mu$ or longer, and has a molecular structure which is not influenced by ultraviolet rays of 290 to 400 m$\mu$ in wavelength. Actually, the poor light resistance thereof is attributable to the absorption region in the longer wavelength region due to processing impurities which contaminate the resin and carbonyl groups formed by oxidation upon thermal hysteresis. Still, polyethylene per se is essentially non-responsive to light in the ultraviolet region. Therefore, even in the process of shifting the absorption wavelength region by the addition of a photosensitizer, ultraviolet rays travel through the materials to be irradiated only a short distance, resulting in non-uniform cross-linking. Also, cross-linking processes require a comparatively long period of time, so that the production of cross-linked foamed products has not extensively been put into practice.

Conventional processes for producing rubber foamed products are as follows. Rubber foamed products can generally be classified into foam rubbers and sponge rubbers. Processes for producing the former are roughly classified into: (1) a sodium silicofluoride process; (2) a thermal coagulating process; and (3) a low temperature coagulating process, according to the process for coagulating the latex, while processes for producing the latter are roughly classified into (A) foaming by mechanical stirring; (B) decomposing a foaming agent; (C) injecting pressurized gas, followed by the removal of pressure; and (D) extracting soluble materials, according to the foaming type, or (a) press curing; (b) autoclave curing; and (c) air vulcanization, according to the type of curing rubber. (A),(B) and (C) are in many cases applied to (c), (a) and (b), respectively, with the application of pressure being a great factor. In any case, a cross-linking process which is required in the production of rubber foamed products involves thermally cross-linking after mechanically compounding a cross-linking agent into the rubber, and requires a comparatively high temperature and a long time. Therefore, various compounding ingredients or modified production steps have been considered, but so far there has been no fundamental use of thermal cross-linking procedures.

1,2-polybutadiene has in every unit a hydrogen atom and a vinyl group both bonded to a tertiary carbon atom at the allyl position, and is therefore, liable to be activated by high energy source such as heat and light. For example, 1,2-polybutadiene comparatively easily undergoes cross-linking and cyclization by short wavelength irradiation (not longer than 350 m$\mu$) and undergoes hardening type degradation. Therefore, thin film 1,2-polybutadiene materials easily become brittle when exposed for several weeks to summer sunlight, and become destroyable by wind force. Due to this property, 1,2-polybutadiene belongs to the class of photodegradable plastics.

It is known that, with a 50$\mu$ thick 1,2-polybutadiene film (trade name: JSR RB-820; made by Japan Synthetic Rubber Co., Ltd.) the specific radiation amount necessary for the hardening degradation is 120 mw·hr/cm$^2$ or less when the wavelength is 254 m$\mu$, and 250 mw·hr/cm$^2$ for 312 m$\mu$ and 600 mw·hr/cm$^2$ for 352 m$\mu$.

SUMMARY OF THE INVENTION

The present invention is an industrially excellent process which enables one to continuously produce wide, long rubber cross-linked foamed products of a high expansion ratio at ordinary pressure, which has so far been difficult, since it is not based on thermal cross-linking.

As a result of investigating the behavior of the physical properties of photodegradable 1,2-polybutadiene during the period UV irradiation is conducted to cause molecular cross-linking and, as the degree of cross-linking increases the movement of molecular chains becomes more inhibited with the main chain being split to cause, in the end, molecular degradation, the inventors have found that the physical properties of the polymer in the cross-linking stage, initial stage of the photo chemical reaction, is suitable for the production of foamed products.

Further research has led the inventors to the present invention which enables one to design a simple process for producing rubber foamed products in a shorter time than is required in conventional processes for producing rubber foamed products, by adding various photosensitizers in a suitable amount to 1,2-polybutadiene and adjusting the strength of ultraviolet irradiation applied thereto.

The present invention relates to a process for producing rubber foamed products of extremely excellent softness. That is, it is concerned with a process for producing a foamed product from low crystalline 1,2-polybutadiene which is a reactive, thermoplastic resin having side chains containing a vinyl group and which is also classified into a synthetic rubber. More particularly, it pertains to a process for producing a photodegradable rubber foamed product of extremely excellent softness by continuous processing by incorporating 0.1 to 3% of a photosensitizer and a thermally decomposable foaming agent into a low crystalline 1,2-polybutadiene, irradiating with UV irradiation of 240 to 400 m$\mu$ in wavelength for a short time (10 minutes or less) to cause photocross-linking to such a degree that the gel fraction (to be described hereinafter) is 30 to 80%, and thereafter heating to 150° to 230° C., whereby cells are not destroyed by blowing pressure.

The present invention is characterized in that a photodecomposable rubber foamed product with high extension ratio excellent in softness can be produced with high efficiency without complicated equipments and procedures as is different from conventional rubber foamed products.

DETAILED DESCRIPTION OF THE INVENTION

In this specification, gel fraction means the percent by weight determined by using a small piece of an ultraviolet ray irradiated molding as a sample, placing this sample in an extraction thimble whose retention particle size is 8$\mu$ with respect to liquid, refluxing boiling toluene for 7 hours using a Soxhlet extractor, drying for 48 hours under reduced pressure (not more than about 3 mmHg), and calculating the percent of the weight of the thus processed sample based on the weight of the sample before processing.

In general, 1,2-polybutadiene polymers can be classified into (1) liquid types having a low molecular weight; (2) completely amorphous ones having a rubbery property; (3) highly crystalline ones having poor heat stability and no workability; and (4) low crystalline ones having a high molecular weight and good workability.

Of these, type (1) requires increased molecular weight and cross-linking upon working, and continuous molding using an extruder or the like is difficult due to the liquid state thereof. Type (2) is so poor in heat fluidity that it is not suitable for processing in a general thermoplastic resin molding machine. With type (3), practical heat molding is difficult since the working temperature almost coincides with the decomposition point. Type (4) is a thermoplastic rubber having a moldability similar to that of thermoplastic resin.

The properties of 1,2-polybutadiene are delicately influenced by the 1,2-bond content, molecular weight, and stereoregular properties of the side chain. In particular, it is necessary to carefully choose conditions in order to provide a polymer with properties required to be a thermoplastic resin and rubber by molecular designing.

The 1,2-polybutadiene used in the present invention is a reactive resin having pendent vinyl groups as side chains, and $\pi$ electrons present in the double bond of the vinyl groups are activated by a wavelength energy of 200 to 400 m$\mu$.

The 1,2-polybutadiene used in the present invention is required to have good heat stability and the same molding property as conventional thermoplastic resins and light responsiveness as photodegradable resins. Therefore, those which possess a comparatively high amount of 1,2-bonds (about 70% or more), a comparatively high molecular weight (not less than 100,000), a comparatively low degree of crystallinity of about 10 to about 50% and 20% or more of a syndiotactic stereospecific structure are desirable.

The 1,2-polybutadiene thermoplastic rubber is a solid having an adhesiveness insufficient to form pellets at room temperature and having, at a temperature above its softening point, a melt visiosity sufficient to form using a conventional molding apparatus. In order to make 1,2-polybutadiene a thermoplastic resin, the 1,2-polybutadiene should be a polymer which contains both a crystalline phase and rubber phase at room temperature due to the properties of the monomers used with the content of crystalline phase being lower than that of the rubber phase. For example, when the polymer consists of only the rubber phase it becomes a polymer belonging to type (2) above, and when it consists of a considerably high amount of crystalline phase, it becomes a type (3) polymer. Further, a polymer consisting only of 1,2-unit has not hitherto been obtained other than one having a relatively low molecular weight which is liquid because of difficulties encountered in polymerization. Therefore, in order to obtain a thermoplastic polymer it is necessary that the resin contain some 1,4-bonds. There is a close inter-relationship between the 1,2-unit content, the stereoregular structure content and degree of crystallinity. That is in 1,2-polybutadiene which is a thermoplastic rubber, the content of syndiotactic configurations increases with the content of the 1,2-bonds. When the 1,2-bond content is considerably high (not less than about 70 mol %) and the syndiotacticity is also relatively high (not less than about 20 mol %), the degree of crystallinity is relatively low (about 10 to about 50 mol %), thus providing a polymer having a molecular weight of not less than about 100,000 which can readily be produced as a thermoplastic rubber. This polymer is a 1,2-polybutadiene polymer employable in this invention.

The 1,2-polybutadiene used in the present invention can be obtained according to methods described in Japanese Patent Publication Nos. 32425/1969, 32426/1969, 38070/1970, 30699/1971, 30700/1971, etc. For example, a solvent, butadiene and catalyst (e.g., cobalt bisacetylacetonate, triphenylphosphine, triethyl aluminum) are introduced into a glass tube in a proportion of Al/Co/p/butadiene = 430/1/2/100,000 (molar ratio) and allowed to react at 10° C. for about 18 hours, followed by adding an aging inhibitor and then stopping the reaction to thereby obtain the desired 1,2-polybutadiene. From X-ray diffraction analysis, the vinyl units in the fine structure of the polymer are present in an amount of about 90% or more.

The 1,2-polybutadiene used in the present invention shows photoresponsiveness in the ultraviolet region based on the transition of $\pi$ electrons present in the double bonds of the side chains thereof. This is increased by the addition of the photosensitizer to such a degree that the polymer can be degraded at the molecular level in a comparatively short time. However, deterioration of various physical properties due to this degradation of the molecular chains is not desirable from the viewpoint of working or use. Therefore, photoresponsiveness must be adjusted so that the physical properties suitable for working or use of the cross-linked material can be maintained until the desired time for the degradation of the molecule. In addition, this must be conducted in a short time.

The photosensitizer should be one which sensitizes in the wavelength region of 240 to 400 m$\mu$ (corresponding to the wavelength region of a high pressure mercury lamp and the wavelength where UV irradiation is transmitted and which activates 1,2-polybutadiene to predominantly cause cross-linking while preventing decomposition of the polymer. For the above purpose, triplet sensitizers, transient metal compounds, radical initiators and photooxdation weakening substances may be used. Of these those which have toxicity or an offensive odor or which are colored cannot be used in this invention. In addition, the photosensitizer should have good miscibility with the polymer since uniform cross-linking is important in this invention. In this respect those photosensitizers having a relatively good oleophilicity can be employed with good results. For example, aromatic ketones such as benzophenone, p,p'-dimethoxybenzophenone, p,p'-dichlorobenzophenone, p,p'-demethylbenzophenone, acetophenone, acetonaphthone, benzoin methyl ether, benzoin ethyl ether, benzoin isopropyl ether, benzoin butyl ether, methyl-O-benzoyl benzoate, benzil, etc., provide good results. In addition, there can be illustrated aromatic aldehydes such as terephthalaldehyde, etc., quinone aromatic compounds such as methylanthraquinone, fluorenone, etc., and the like. These photosensitizers are used in a concentration of about 0.1 to about 3.0%, preferably 0.3 to 1.0%. If they are used in a lesser concentration, physical properties suitable for the production of foamed products are difficult to obtain, while if they are used in a greater concentration it is difficult to control the degree of cross-linking to a uniform level between the surface layer and the inner layer, resulting in a deterioration of the surface layer and the formation of a non-foamable, thick surface layer.

1,2-polybutadiene having a three-dimensional structure suitable for foaming can be obtained within 10 minutes by irradiating the polymer material containing the photosensitizer in such an amount with 365 m$\mu$ light of about a 10 to about a 150 w/m$^2$ ultraviolet ray intensity for at least about 15 seconds. The minimum irradiation time varies depending upon the content of the photosensitizer, the composition involved and thickness of the article to be irradiated. However, it can generally be said that an irradiation time below about 15 seconds cannot lead to a uniform photochemical reaction of the article subjected to irradiation. The thickness of the materials processed in accordance with this invention is usually from about 1 to about 5 mm. When OBSH is used as a foaming agent, materials 15 mm or more in thickness can be processed in accordance with this invention.

Since UV rays emitted from a UV lamp have a certain wavelength distribution, the total amount of energy of the UV rays having such a wavelength distribution irradiated on a spot varies depending upon the wavelength distribution and the distance of the spot from the light source (UV lamp). The intensity of the UV rays irradiated on a certain spot of the article to be irradiated is not a function of light energy emitted from a certain point of the light source. Generally, the intensity of the UV rays is indicated by an intensity distribution curve where UV rays having a certain wavelength can be represented as an irradiation plane. Thus, in the present invention sufficient results are obtained by conducting irradiation such that the article to be irradiated receives such an amount of energy as provided by 365 m$\mu$ light of about 10 to about 150 w/m$^2$ for about 15 seconds to about 10 minutes. The gel fraction in boiling toluene of the thus irradiated material is 30 to 80% in 7 hours, and about 10 to about 75% in 15 hours.

The irradiation time also varies depending upon the wavelength distribution of the light source; however, it is not desirable to irradiate for above about 10 minutes since side reactions occur due to the nature of 1,2-polybutadiene containing a photosensitizer. The temperature and pressure of UV irradiation are limited in no substantial way and usually irradiation is performed at room temperature and at atmospheric pressure. Of course, care must be taken so as not to elevate the temperature of the resin above its softening point since manipulation becomes difficult and side reactions such as oxidation of the polymer occurs at such temperature.

If materials containing the cross-linking agent in lesser concentrations than above are irradiated with stronger light or if materials containing the cross-linking agent in a greater concentration are irradiated with weaker light, it is difficult to uniformly cross-link the materials.

In particular, it is necessary to adjust the viscosity in a manner specific to the ultraviolet ray cross-linking of the present invention, since in the present invention as a photosensitizer responds to ultraviolet rays the photoresponsiveness of the 1,2-polybutadiene is raised, chemical cross-linking is predominantly conducted and splitting of the main chain proceeds less frequently. This is delicately influenced by a foaming agent, antioxidant, and other compounding ingredients.

Experiments have shown that a foaming agent is desirably added in an amount of about 0 to about 20 parts, and the antioxidant in an amount of about 0.05 to about 1 part. As the other compounding ingredients, there can be illustrated a filler and the like. Generally speaking, those which do not absorb UV rays are selected and there is no specific limitation on the amounts of other compounding ingredients to be added. Foaming temperatures are 150° to 230° C. at which temperature the cells are not destroyed by the blowing pressure. The UV cross-linked 1,2-polybutadiene of the present invention undergoes a reduction in viscosity with an increase in temperature as thermoplastic resins. Therefore, if the temperature is less than 150° C., the viscosity necessary for foaming cannot be obtained, while if it is higher than 230° C., gas leakage due to a reduction in viscosity becomes serious and oxidation proceeds, whereby good products with a high expansion ratio are difficult to obtain.

Although not to be construed as limitative, foaming is usually carried out at atmospheric pressure. It is preferred that foaming be performed at superatmospheric pressure when minute bubbles are desired.

The foaming time in which the foaming agents decompose and expansion is completed varies depending upon the kind and amount of the foaming agent, and is not particularly limited.

Foaming agents include, for example, azodicarbonamide, dinitrosopentamethylenetetramine, p-toluenesulfonylhydrazide, p,p'-oxybis(benzenesulfonylhydrazide), etc., which may be used, if necessary or desired, in combination. Foaming aids and foaming nuclei may also be added, if desired.

The amount of the foaming agent used varies depending upon aimed expansion ratio. Additives such as a photosensitizer, a foaming agent and, if necessary or desired, an aging inhibitor, a softening agent, a colorant, etc., can be added to 1,2-polybutadiene within the above described conditions, and fed to a kneader and formed into a sheet or other form at a temperature higher than the resin softening point but lower than the decomposition point of the foaming agent used (generally, about 150° C.), then irradiated with ultraviolet rays for a short time (about 15 seconds to about 10 minutes) to convert to a resin into a three dimensional structure, followed by heating to a temperature higher than the decomposition point of the foaming agent to foam and expand the resin. Thus, there can be continuously obtained photodegradable foamed products of excellent softness.

While not to be construed as limitative, usually employed expansion ratios are from about 1 to about 25 times.

The process of the present invention enables one to produce a cross-linked material capable of foaming to a depth of about 7 mm within 10 minutes using a high pressure mercury lamp emitting radiation of a wavelength of 240 to 400 m$\mu$. Thus, a highly productive continuous process can be designed and can be put into practice.

As explained in detail above UV ray cross-linked foamed products of 1,2-polybutadiene can be obtained in accordance with the present invention by irradiating a material prepared by kneading a base resin with suitable amounts of a photosensitizer and a thermodecomposable foaming agent with UV rays to form a suitably cross-linked material, and then heating to a temperature higher than the decomposition point of the foaming agent. This cross-linking suitably adjusts and controls the photodegradable property of 1,2-polybutadiene from the viewpoint of mechanism and velocity, and hence the kind and amount of the photosensitizer, intensity and irradiation time of UV must be delicately adjusted. Too much photosensitizer makes control difficult, resulting in over cross-linking, while insufficient photosensitizer fails to cause complete cross-linking at an economically advantageous velocity.

Compositions containing 1,2-polybutadiene and a photosensitizer alone enable one to easily adjust the cross-linking degree, and obtain a comparatively high cross-linking degree. However, when a large amount of compounding ingredients are incorporated therein, the average cross-linking degree becomes low, and, taking this into consideration, a photosensitizer is usually added in excess as compared with the necessary amount. However, this is not favorable, since remaining photosensitizer causes post cross-linking, and hardening proceeds further to cause a degradation in product quality.

As earlier indicated, in practice various additives are utilized which generally scatter, obstruct or absorb UV rays to prevent full transmission to inter portion of the article being irradiated. Further, in the case that one desires to form cross-linked foamed products of a comparatively high expansion ratio, foaming agent must be added thereto in a relatively large amount, which typically also exhibits such a UV scattering, etc., effect.

In a highly preferred embodiment of the present invention, the inventors have discovered that p,p'-oxybis(benzenesulfonylhydrazide) (hereinafter often abbreviated as OBSH) is utilized, as this material does not prevent the transmission of UV rays, rather, accelerates the photosensitizing effect achieved.

OBSH is a powdery foaming agent having a decomposition point of about 165° C. When this is used in a foaming composition, the efficiency of the photosensitizer is scarcely reduced and, in addition, uniform UV ray cross-linked material having a comparatively high cross-linking degree can be obtained since OBSH per se participates in the cross-linking. OBSH does not have a melting point and is slightly soluble in ordinary solvents. Therefore, it may appear to form a heterogeneous system with 1,2-polybutadiene. It was, therefore, a surprising fact that OBSH transmits UV rays well and provides a uniform and relatively high cross-linking degree, and that OBSH per se participates in the cross-linking. This may be attributed to that OBSH is a strong absorbent of UV rays and has a sensitizing action, and that OBSH per se acts as a UV ray cross-linkable foaming agent on 1,2-polybutadiene. The advantage of OBSH being a foamable cross-linking agent is that it does not possess, after its decomposition as a foaming agent, a sensitizing action, that is, OBSH not having participated in the cross-linking is decomposed and consumed as a foaming agent.

The contribution of OBSH to the cross-linking becomes greater in proportion to the concentration thereof, and the effective compounding ratio is 0.5 part or more, desirably 1.0 part or more, based on 1,2-polybutadiene.

If desired, in appropriate cases OBSH can be used in combination with other foaming agents such as azodicarbonamide, dinitrosopentamethylenetetramine, toluenesulfonylhydrazide, etc. The other compounding ingredients earlier enumerated are, of course, compatible therewith.

Examples of the present invention are set forth below. Unless otherwise indicated all parts and percentages used herein are by weights.

EXAMPLE 1

Pellets prepared by mixing 100 parts of syndiotactic 1,2-polybutadiene having a density of 0.901 g/cm$^3$, a 1,2-unit content of 90%, a syndiotactic structure content of 51%, a viscosity measured at 25° C. in toluene of 1.38 dl/g, a vicat softening point of 39° C., a melting point of 75° C., and a glass transition point of $-30°$ C. (trade name: JSR, RB-810; made by Japan Synthetic Rubber Co., Ltd.) with 10 parts of azodicarbonamide and 0.7 part of benzophenone were fed to an extruder and a sheet 30 cm in width and 0.3 cm in thickness continuously extruded at a velocity of 1 m/min. This sheet was then irradiated with ultraviolet rays for 3 minutes using 1 kw high pressure mercury lamps (H4000L/3; made by Tokyo Shibaura Electric Co., Ltd.) 30 cm from both sides. The foaming agent was then decomposed by heating to 215° C. to obtain a rubber foamed product of a 0.06 specific gravity having a uniform, fine cellular structure which was much softer than a polyethylene cross-linked foamed product of the same expansion ratio, and which showed no bending impression upon bending ascribable to the stretching property of the base resin. When this foamed material was exposed to outdoor sunlight, destruction of its original shape was quite easy within 1 month, whereas no change was observed when it was left for 6 months in a room. The production rate in this case was about 810 g/min., and, in terms of volume, about 13.5 l/min, good productivity from the process thus being demonstrated. The gel fraction of this foamed product was about 35%.

EXAMPLE 2

100 parts of syndiotactic 1,2-polybutadiene having a density of 0.906 g/cm$^3$, a 1,2-unit content of 92%, a syndiotactic structure content of 66%, a viscosity measured at 25° C. in toluene of 1.24, a vicat softening point of 52° C., a melting point of 80° C. and a glass transition point of $-25°$ C. (trade name: JSR, RB-820: made by Japan Synthetic Rubber Co., Ltd.), 75 parts of an azodicarbonamide foaming agent (trade name: Spangcell DW#25: made by Eiwa Chemicals Co., Ltd.) having a decomposition point of 170° to 180° C., 0.5 part of 2,6-di-tert-butyl-4-methylphenol, an ageing inhibitor, and 2.5 parts of benzophenone was kneaded at about 90° to about 100° C. for 10 minutes using two heated rolls to obtain a crude sheet, which was pelletized to obtain a master batch. This master batch was diluted with pellets of SJR, RB 820 to a dilution ratio of 1:5 and the resulting mixture was extruded using a uniaxial extruder of 90 mm$\phi$ under the conditions of a compression ratio of 3.1, a speed of 8 to 15 rpm and a temperature of 50° to 110° C. to prepare various 1 mm thick sheets. These sheets were then irradiated for 1 to 15 minutes with UV rays at a distance of 30 cm using 1 kw high pressure mercury lamp (from both sides), then the cross-linked sheet was foamed at a temperature of 170° to 230° C. As a result, sheets irradiated for 2 to 10 minutes showed a viscosity suitable for foaming. When irradiation time was shorter than 2 minutes, there resulted an insufficient viscosity which failed to foam an expanded material, while when longer than 10 minutes was used, oxidation of the surface layer proceeded so much that the surface skin layer became colored. The temperature suitable for foaming was found to be 180° to 230° C. Lower temperatures led to insufficient expansion, while higher temperatures caused serious leakage of gas, resulting in a reduction in the expansion ratio and serious coloration due to oxidation. The gel fraction of sheets irradiated for 2 to 10 minutes was about 30 to 60%, and the expansion ratio (maximum) was 18 times.

EXAMPLE 3

Irradiation was conducted for 1 to 20 minutes in the same manner as in Example 2 except for changing the amount of benzophenone to 0.1 to 3.0%. As a result, a viscosity suitable for foaming was obtained by irradiating for 10 minutes or less. Comparatively good foamed products were obtained at a concentration of about 0.3 to 1.0% benzophenone. The gel fraction was about 80% (maximum).

EXAMPLE 4

Syndiotactic 1,2-polybutadiene the same as was used in Example 1 was mixed with 10 parts of p,p'-oxybis(-benzenesulfonyl)hydrazide and 1.0 part of terephthalaldehyde and the resulting mixture was kneaded using two heated rolls at about 80° to 90° C. to prepare about a 5 mm thick crude sheet having a poor surface appearance, the sheet was then placed in a die 5 mm thick and then pressed at about 90° to about 100° C. at a pressure of about 50 kg/cm$^2$ for about 5 to about 10 minutes to prepare a 5 mm thick sheet having a good surface appearance. The thus obtained sheet was withdrawn from the die after it was cooled, and then cross-linked in the same manner as in Example 1 and foamed at 165° C. to obtain a foamed product of a 0.15 specific gravity.

EXAMPLES 5 TO 11 AND COMPARATIVE EXAMPLES 1 AND 2

100 parts of 1,2-polybutadiene rubber was kneaded with predetermined amounts of a photosensitizer and a foaming agent as given in Table 1 using heated rolls at about 80° to about 90° C. for about 10 minutes to prepare about a 1 mm thick crude sheet having a poor surface appearance. The sheet was placed in a die of 1 mm thickness and then pressed at about 90° to about 100° C. and at a pressure of about 50 kg/cm$^2$ for about 5 to about 10 minutes to prepare a 1 mm thick sheet having a good surface appearance. The thus obtained sheet was withdrawn from the die after it was cooled. The resulting sheet was then irradiated with UV rays for 5 minutes from both sides at a distance of 30 cm using 1 kw high pressure mercury lamp (H4000L/3; made by Tokyo Shibaura Electric Co., Ltd.). In general, gel fraction increases with increased cross-linking degrees because of solvent insolubility. Therefore, the gel fraction of irradiated sheets was measured by refluxing in boiling toluene for 15 hours using a Soxhlet extractor to compare the degree of cross-linking. The results are tabulated in Table 1.

TABLE 1

| | Comparison of Cross-Linking Degree in Terms of Gel Fraction | | | | |
|---|---|---|---|---|---|
| Example No. | Photosensitizer (parts by weight) Benzophenone | Foaming Agent (parts by weight) OBSH | ADCA* | Gel Fraction (%) | Notes |
| 5 | 0.5 | 0 | 0 | 56.0 | transparent sheet containing the sensitizer and no foaming agent |
| 6 | 0 | 5.0 | 0 | 4.5 | OBSH alone |
| 7 | 0 | 10.0 | 0 | 9.8 | |
| 8 | 0.5 | 10.0 | 0 | 65.5 | OBSH-sensitizer |
| 9 | 0 | 2.5 | 7.5 | 7.5 | mixture of OBSH and ADCA alone |
| 10 | 0.5 | 2.5 | 7.5 | 19.8 | OBSH-ADCA-sensitizer |
| 11 | 0.5 | 0 | 10.0 | 10.5 | ADCA-sensitizer |
| Comparative Example 1 | 0 | 0 | 10.0 | 0 | ADCA alone |
| Comparative Example 2 | 0 | 0 | 0 | 0 | blank test |

*ADCA stands for azodicarbonamide

The results in Table 1 show that an opaque sheet containing OBSH as shown in Example 8 provided a higher gel fraction than that of transparent sheet as set forth in Example 5 containing a photosensitizer alone and not containing a foaming agent.

Judging from this fact and the values of Example 7, it is seen that OBSH scarcely inhibits the cross-linking effect of the photosensitizer. Examples 6 and 7 show that OBSH per se functions as a foamable UV ray cross-linking agent. Also, another foaming agent, ADCA, provided a gel fraction of only about 10% as in Example 11 where a sensitizer was used. Thus, ADCA reduces the cross-linking efficiency. Examples 9 and 10 show that OBSH has the effect of improving the degree of cross-linking and Example 8 shows that a comparatively high degree of cross-linking can be obtained. Comparative Examples 1 and 2 correspond to blank tests. When irradiated sheets as in Examples 8 and 10 are foamed at a temperature higher than the decomposition point of the foaming agent, there can be obtained very soft foamed products having extremely uniform cells. Thus, it can be seen that OBSH is an excellent UV ray cross-linkable foaming agent for 1,2-polybutadiene, capable of providing a uniform and comparatively high degree of cross-linking.

EXAMPLE 12

The same composition as was used in Example 8 was kneaded using two heated rolls in the same manner as in Example 4 to prepare sheets about 4 mm in thickness. Three of the thus obtained sheets were placed in a die of 12 mm thickness one on the other followed by pressing using a heated press at about 90° to about 100° C. and at a pressure of about 50 kg/cm$^2$ to form a 12 mm thick sheet. The resulting sheet was then irradiated with UV rays for about 7 minutes from both sides in the same as in Example 5 followed by heating at a temperature of 190° C. for 10 minutes to obtain a 25 mm thick, white, elastic foamed product of a 0.08 g/cm$^3$ specific gravity which was of good quality and had uniform bubbles throughout the thickness of the sheet.

EXAMPLE 13

100 parts of 1,2-polybutadiene (trade name: JSR, RB 810; made by Japan Synthetic Rubber Co., Ltd.), 0.5 parts of benzophenone, and 17 parts of a foaming agent consisting of ADCA and OBSH (ADCA:OBSH = 1:1 in part by weight) were kneaded in the same manner as in Example 1 to prepare a 1 mm thick sheet. The resulting sheet was irradiated with UV rays in the same manner as in Example 5 followed by foaming at 205° C. to obtain a uniformly foamed product of a 0.044 bulk specific gravity having minute bubbles. The gel fraction of this foamed product was about 40%.

A foamed product having a high expansion ratio such as those obtained in this example can be obtained with a considerably high gel fraction and in this regard the content of OBSH in the foaming agent used should be about 25%. The products of this invention are useful as shock absorbers, packing materials, wrapping materials, heat insulating materials, etc. In particular, the foamed products of the present invention are most suited for backing materials such as for carpets, mats and the like, since they have excellent flexibility, elasticity and buffering properties.

While the invention has been described in detail and with reference to specific embodiments thereof, it will be apparent to one skilled in the art that various changes and modifications can be made therein without departing from the spirit and scope thereof.

What is claimed is:

1. A process for producing a photodegradable rubber foam product which comprises, in sequence:

mixing essentially 1,2-polybutadiene with 0.1 to 3% of a photosensitizer and with a thermally decomposable foaming agent, said 1,2-polybutadiene having about 70% or more 1,2-bonds, a molecular weight of not less than 100,000, a degree of crystallinity of about 10 to about 50% and 20% or more of a syndiotactic stero specific structure;

irradiating the resulting mixture with ultraviolet irradiation of a wavelength of 240 to 400 mμ for about 10 minutes or less to form a cross-linked material having a gel fraction of 30 to 80% (in boiling toluene; 7 hours); and heating the resulting cross-linked material to 150° to 230° C. to decompose the foaming agent and produce a photodegradable rubber foam product.

2. A process of claim 1, wherein said photosensitizer is an aromatic ketone, an aromatic aldehyde or a quinone aromatic compound.

3. The process of claim 2 wherein said photosensitizer is benzophenone, p,p'-dimethoxybenzophenone, p,p'-dichlorobenzophenone, p,p'-dimethylbenzophenone, benzoin methyl ether, benzoin ethyl ether, benzoin isopropyl ether, benzoin butyl ether, methyl-O-benzoyl benzoate, benzil, fluorenone, terephthalaldehyde or methyl anthraquinone.

4. The process of claim 1 wherein said foaming agent is added in an amount of about 0 to about 20 parts by weight per 100 parts by weight of 1,2-polybutadiene.

5. The process of claim 4 wherein said foaming agent is azodicarbonamide, dinitrosopentamethylenetetramine, p-toluenesulfonylhydrazide or p,p'-oxybis(benzenesulfonylhydrazide).

6. The process of claim 5 wherein said foaming agent is p,p'-oxybis(benzenesulfonylhydrazide).

7. The process of claim 1 wherein the irradiating with ultraviolet rays is for at least about 15 seconds.

8. The process of claim 1 whereby a photodegradable rubber foamed product can be continuously produced.

9. The process of claim 1 which consists essentially of the steps recited therein.

* * * * *

UNITED STATES PATENT AND TRADEMARK OFFICE
CERTIFICATE OF CORRECTION

PATENT NO. : 4,144,153
DATED : March 13, 1979
INVENTOR(S) : YASUO SHIKINAMI ET AL It is certified that error appears in the above—identified patent and that said Letters Patent are hereby corrected as shown below:

Col. 13, Claim 1, line 28, delete "stero" and insert therefor

— stereo —.

Signed and Sealed this

*Fourth* Day of *September 1979*

[SEAL]

*Attest:*

LUTRELLE F. PARKER
*Attesting Officer*  *Acting Commissioner of Patents and Trademarks*